US011323009B2

(12) United States Patent
Okamoto et al.

(10) Patent No.: US 11,323,009 B2
(45) Date of Patent: May 3, 2022

(54) ROTATING ELECTRIC MACHINE UNIT

(71) Applicant: DENSO CORPORATION, Kariya (JP)

(72) Inventors: Ryotaro Okamoto, Nisshin (JP); Hirofumi Kinjo, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 524 days.

(21) Appl. No.: 16/369,671

(22) Filed: Mar. 29, 2019

(65) Prior Publication Data

US 2019/0312487 A1 Oct. 10, 2019

(30) Foreign Application Priority Data

Apr. 5, 2018 (JP) .............................. JP2018-073145

(51) Int. Cl.
*H02K 9/19* (2006.01)
*H02K 5/20* (2006.01)
*H02K 11/33* (2016.01)
*B60L 50/50* (2019.01)

(52) U.S. Cl.
CPC ................ *H02K 9/19* (2013.01); *B60L 50/50* (2019.02); *H02K 5/20* (2013.01); *H02K 11/33* (2016.01); *H02K 2209/00* (2013.01)

(58) Field of Classification Search
CPC .......... H02K 1/32; H02K 9/193; H02K 9/197; H02K 7/006; H02K 1/20; H02K 2209/00; H02K 5/20; B60L 50/50
USPC ............................ 310/52, 53, 57, 64, 54, 61
See application file for complete search history.

(56) References Cited

U.S. PATENT DOCUMENTS

| 2,947,894 A | * | 8/1960 | Strang ...................... H02K 3/28 310/202 |
| 3,633,057 A | * | 1/1972 | Smith ...................... H02K 7/14 310/184 |
| 5,271,248 A | * | 12/1993 | Crowe ...................... H02K 9/19 310/52 |
| 2014/0265680 A1 | * | 9/2014 | Bradfield ............... H02K 23/08 310/83 |
| 2016/0126808 A1 | | 5/2016 | Nagao et al. |

(Continued)

FOREIGN PATENT DOCUMENTS

| JP | 2013-102105 A | 5/2013 |
| JP | 2016-063567 A | 4/2016 |

*Primary Examiner* — Tulsidas C Patel
*Assistant Examiner* — Robert E Mates
(74) *Attorney, Agent, or Firm* — Oliff PLC

(57) ABSTRACT

A rotating electric machine unit includes a rotating electric machine, a high heat generation circuit and a low heat generation circuit both of which are electrically connected with the rotating electric machine, a first cooler, a first-coolant supplier, a second cooler and a second-coolant supplier. The first cooler is configured to cool both the high heat generation circuit and the low heat generation circuit with a first coolant. The first-coolant supplier is configured to supply the first coolant to the first cooler. The second cooler is configured to cool the rotating electric machine with a second coolant. The second-coolant supplier is configured to supply the second coolant to the second cooler. The second-coolant supplier is formed integrally with a low heat generation circuit-cooling part of the first cooler. The second-coolant supplier includes a heat exchanger via which heat is exchanged between the first coolant and the second coolant.

7 Claims, 8 Drawing Sheets

(56) References Cited

U.S. PATENT DOCUMENTS

| | | | |
|---|---|---|---|
| 2016/0164378 A1* | 6/2016 | Gauthier | H02K 5/20 310/54 |
| 2016/0261158 A1* | 9/2016 | Horii | H02K 1/274 |

* cited by examiner

ROTATING ELECTRIC MACHINE UNIT

CROSS-REFERENCE TO RELATED APPLICATION

This application is based on and claims priority from Japanese Patent Application No. 2018-73145 filed on Apr. 5, 2018, the contents of which are hereby incorporated by reference in their entirety into this application.

BACKGROUND

1 Technical Field

The present disclosure relates to rotating electric machine units that include a rotating electric machine and electric circuits electrically connected with the rotating electric machine.

2 Description of Related Art

There known rotating electric machine units that include a rotating electric machine, such as an electric motor, an electric generator or a motor-generator mounted in, for example, a hybrid vehicle or an electric vehicle, and electric circuits electrically connected with the rotating electric machine. These rotating electric machine units also include coolers (or cooling units) to reduce negative effects of heat flows generated by the rotating electric machine and the electric circuits.

In particular, when the heat flows generated by the rotating electric machine and the electric circuits interact with each other, the negative effects of the heat flows on the rotating electric machine and the electric circuits are significant.

To solve the above problem, Japanese Patent Application Publication No. JP2016092931A discloses a rotating electric machine unit which includes: a first cooler provided between the rotating electric machine and a first electric circuit to suppress interaction between the heat flow generated by the rotating electric machine and the heat flow generated by the first electric circuit; and a second cooler provided between the first electric circuit and a second electric circuit to suppress interaction between the heat flow generated by the first electric circuit and the heat flow generated by the second electric circuit. Consequently, it is possible to reduce the negative effects of the heat flows on the rotating electric machine and the first and second electric circuits.

During operation of the rotating electric machine, the amount of heat generated by the first electric circuit and the amount of heat generated by the second electric circuit may be different from each other. However, this factor is not taken into account in the rotating electric machine unit disclosed in the above patent document. Therefore, there is still room for improvement in cooling the rotating electric machine unit.

SUMMARY

According to a first aspect of the present disclosure, there is provided a first rotating electric machine unit which includes a rotating electric machine, a plurality of electric circuits electrically connected with the rotating electric machine, a first cooler, a first-coolant supplier, a second cooler and a second-coolant supplier. The plurality of electric circuits include a high heat generation circuit and a low heat generation circuit that generates less heat than the high heat generation circuit during operation of the rotating electric machine. The first cooler is configured to cool both the high heat generation circuit and the low heat generation circuit with a first coolant. The first-coolant supplier is configured to supply the first coolant to the first cooler. The second cooler is configured to cool the rotating electric machine with a second coolant. The second-coolant supplier is configured to supply the second coolant to the second cooler. The second-coolant supplier is formed integrally with a low heat generation circuit-cooling part of the first cooler; the low heat generation circuit-cooling part is configured to cool the low heat generation circuit. The second-coolant supplier includes a heat exchanger via which heat is exchanged between the first coolant and the second coolant.

With the above configuration, the amount of heat generated by the low heat generation circuit during operation of the rotating electric machine is less than the amount of heat generated by the high heat generation circuit during operation of the rotating electric machine. Therefore, when the first coolant is supplied by the first-coolant supplier to the first cooler to cool the high heat generation circuit and the low heat generation circuit, there is an excess of the cooling capacity of the low heat generation circuit-cooling part of the first cooler.

In consideration of the above, the first rotating electric machine unit is configured to cool the rotating electric machine utilizing the excess cooling capacity of the low heat generation circuit-cooling part of the first cooler. Specifically, the second-coolant supplier is formed integrally with the low heat generation circuit-cooling part of the first cooler. Moreover, the second-coolant supplier includes the heat exchanger via which heat is exchanged between the first coolant and the second coolant. Consequently, it becomes possible to cool the second coolant utilizing the excess cooling capacity of the low heat generation circuit-cooling part of the first cooler and to suitably cool the rotating electric machine using the thus-cooled second coolant.

According to a second aspect of the present disclosure, there is provided a second rotating electric machine unit which includes a rotating electric machine, a plurality of electric circuits, a cooler and a coolant supplier. The rotating electric machine includes a rotating shaft, a rotor fixed on the rotating shaft to rotate together with the rotating shaft, and a stator located radially outside the rotor. The electric circuits are electrically connected with the rotating electric machine. The cooler is configured to cool the rotating electric machine with a coolant. The coolant supplier is configured to supply the coolant to the cooler. The coolant supplier includes an in-shaft flow path which is formed in the rotating shaft along an axial direction thereof and through which the coolant flows. The coolant supplier also includes an in-rotor flow path that is formed in the rotor. In axial end faces of the rotor, there are formed openings of the in-rotor path. The coolant supplier is configured so that the coolant flows from the in-shaft flow path into the in-rotor flow path and flows out of the in-rotor flow path via the openings. The stator includes a stator core having a plurality of slots formed therein and a stator coil wound on the stator core so as to be received in a plurality of radially-aligned layers in each of the slots of the stator core. The stator coil is a multi-phase coil that is comprised of a plurality of phase windings. The phase windings are electrically connected with each other at a selected one of a plurality of neutral points. Each of the phase windings includes a first winding section and a second winding section that are connected in series with each other. The first winding sections of the phase windings are always kept in an energized state during operation of the rotating electric machine. The second winding sections of the phase windings are kept in an energized state only when the rotating electric machine is in a specific operating state. The stator coil has a pair of coil end parts protruding axially outward respectively from opposite axial end faces of the stator core. The first and second winding sections of the phase windings of the stator coil are received in the slots of the stator core so that at least part of the first winding sections are located radially inside the second winding sections.

With the above configuration, the amount of heat generated by the first winding sections of the phase windings of the stator coil is greater than the amount of heat generated by the second winding sections of the phase windings of the stator coil. Accordingly, in terms of more suitably cooling the rotating electric machine, it is preferable to preferentially cool the first winding sections in the phase windings of the stator coil.

In consideration of the above, in the second rotating electric machine unit, the first and second winding sections of the phase windings of the stator coil are received in the slots of the stator core so that at least part of the first winding sections are located radially inside the second winding sections. Accordingly, in the coil end parts of the stator coil, at least part of first coil end parts, which are formed of the first winding sections, are located radially inside second coil end parts that are formed of the second winding sections. Consequently, it becomes possible to preferentially cool the first winding sections in the phase windings of the stator coil using the second coolant, thereby more suitably cooling the rotating electric machine.

DESCRIPTION OF EMBODIMENTS

Figure 1:
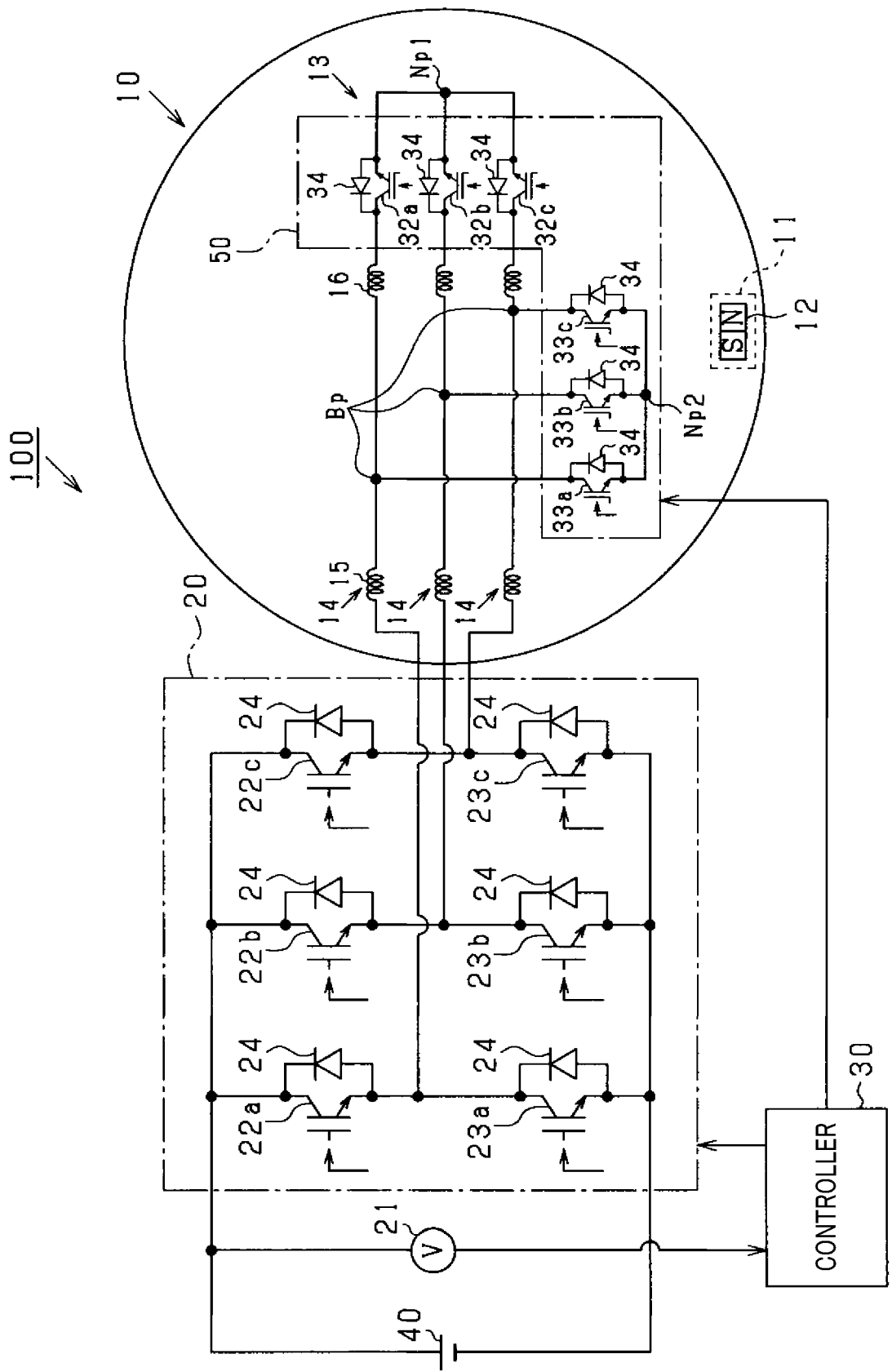
FIG. 1 is a schematic circuit diagram of a rotating electric machine unit according to a first embodiment.

Exemplary embodiments and their modifications will be described hereinafter with reference to FIGS. 1-11B. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 2:
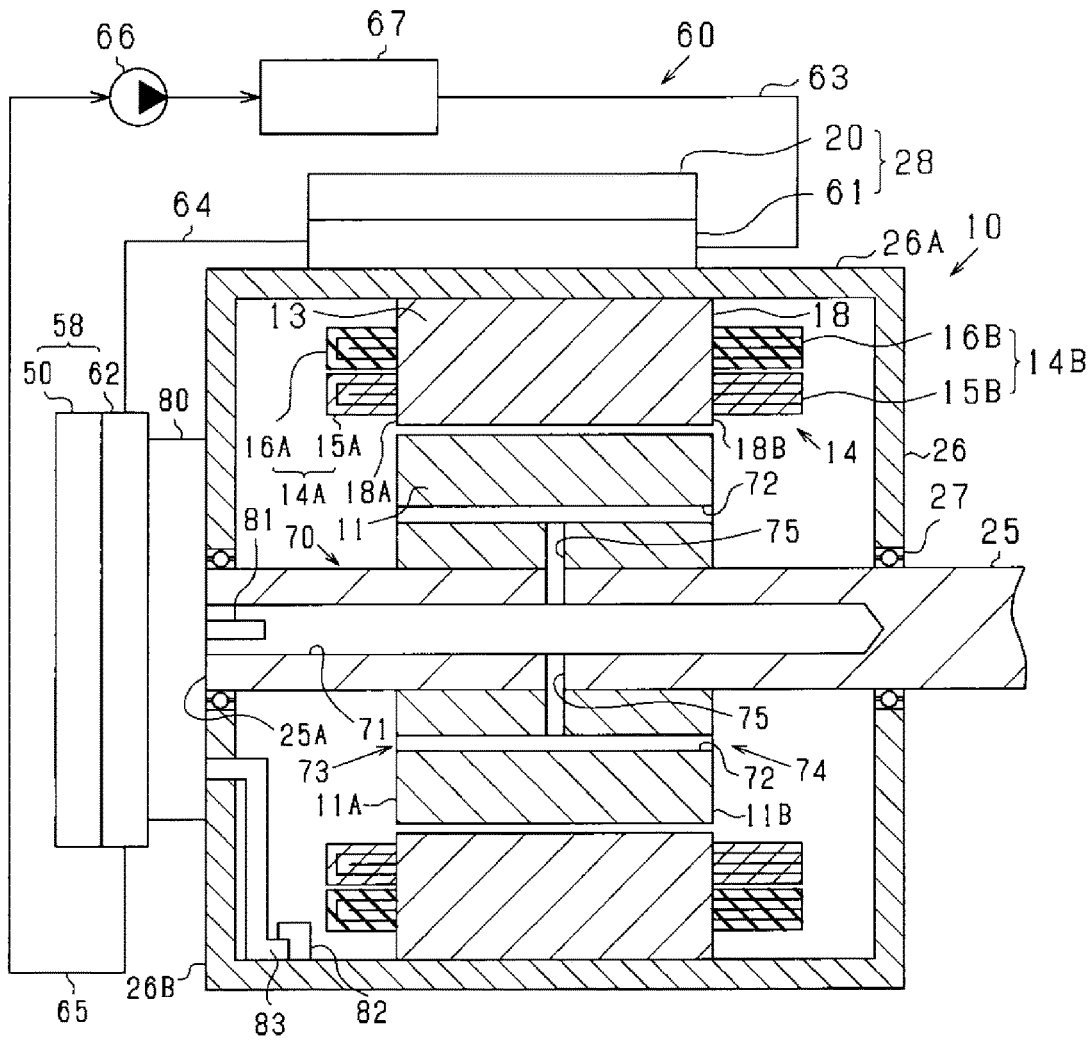
FIG. 2 is a schematic cross-sectional view of the rotating electric machine unit according to the first embodiment, omitting a controller of the rotating electric machine unit.

FIGS. 1 and 2 show the overall configuration of a rotating electric machine unit 100 according to the first embodiment.

In the present embodiment, the rotating electric machine unit 100 is applied to an in-vehicle motor control system.

As shown in FIG. 1, the rotating electric machine unit 100 includes a rotating electric machine 10, an inverter 20, a controller 30 and a winding switching circuit 50.

In the present embodiment, the rotating electric machine 10 is configured as a motor-generator to selectively operate in a motor mode and a generator mode. In the motor mode, the rotating electric machine 10 generates, using electric power supplied from a battery 40, propulsive power (or torque) for driving the vehicle. On the other hand, in the generator mode, the rotating electric machine 10 generates, using regenerative braking energy (or deceleration energy), electric power for charging the battery 40.

As shown in FIGS. 1 and 2, the rotating electric machine 10 includes a rotor 11 and a stator 13.

In the rotor 11, there are provided a plurality of permanent magnets 12 for creating a magnetic field. That is, the rotating electric machine 10 is a permanent magnet field rotating electric machine. Each of the permanent magnets 12 is implemented by, for example, a neodymium magnet.

In addition, for the sake of simplicity, only one pair of permanent magnets 12 is schematically shown in FIG. 1. It should be noted that the number of the permanent magnets 12 may be suitably set according to the rating and design specification of the rotating electric machine 10.

The stator 13 includes a three-phase stator coil 14 and a hollow cylindrical (or annular) stator core 18. The stator coil 14 is comprised of U, V, and W phase windings. Each of the phase windings is wave-wound on the stator core 18. Moreover, each of the phase windings includes a first winding section 15 and a second winding section 16 that are connected in series with each other via the winding switching circuit 50.

For each of the phase windings, a first end of the first winding section 15 of the phase winding is connected to the inverter 20. A second end of the first winding section 15 is connected to a first end of the second winding section 16 of the phase winding. A second end of the second winding section 16 is connected to a first neutral point Np1. Moreover, the second end of the first winding section 15 is connected, via an intermediate point Bp between the first and second winding sections 15 and 16, to a second neutral point Np2 that is different from the first neutral point Np1. That is, ends of the phase windings 14 are connected at the neutral points Np1 and Np2.

The winding switching circuit 50 includes three first switches 32 respectively corresponding to the U, V and W phases; the three first switches 32 are respectively constituted of switching elements 32a, 32b and 32c. The winding switching circuit 50 also includes three second switches 33 respectively corresponding to the U, V and W phases; the three second switches 33 are respectively constituted of switching elements 33a, 33b and 33c.

For each of the phase windings of the stator coil 14, the first switch 32 is connected between the second end of the second winding section 16 of the phase winding and the first neutral point Np1. On the other hand, the second switch 33 is connected between the second end of the first winding section 15 of the phase winding and the second neutral point Np2.

In the present embodiment, each of the switching elements 32a-32c and 33a-33c is implemented by a voltage-controlled semiconductor switching element, more particularly by a SiC switching element. Moreover, each of the switching elements 32a-32c and 33a-33c has a freewheeling diode 34 connected in antiparallel thereto.

In addition, in the present embodiment, the winding switching circuit 50 corresponds to a "low heat generation circuit".

The stator coil 14 of the rotating electric machine 10 is connected, via the inverter 20, to the battery 40 which is a DC power source. The battery 40 outputs a DC voltage of, for example, 200V or higher.

In the present embodiment, the battery 40 is an assembled battery in which a plurality of lithium ion storage batteries are connected in series with each other. It should be noted that the battery 40 may alternatively be implemented by other storage batteries.

The inverter 20 includes three switch pairs respectively corresponding to the U, V, and W phases. Each of the switch pairs consists of an upper-arm (or high-potential-side) switch 22 and a lower-arm (or low-potential-side) switch 23 that are connected in series with each other. The upper-arm switches 22 of the three switch pairs are respectively constituted of switching elements 22a, 22b and 22c. Similarly, the lower-arm switches 23 of the three switch pairs are respectively constituted of switching elements 23a, 23b and 23c. Moreover, the three switch pairs are connected in parallel with each other.

For each of the U, V and W phases, one of the phase windings of the stator coil 14 which corresponds to the phase is connected to a node (or junction point) between the upper-arm and lower-arm switches 22 and 23 of the switch pair corresponding to the phase.

In the present embodiment, each of the switching elements 22a-22c and 23a-23c is implemented by a voltage-controlled semiconductor switching element, more particularly by an IGBT (Insulated Gate Bipolar Transistor). Moreover, each of the switching elements 22a-22c and 23a-23c has a freewheeling diode 24 connected in antiparallel thereto.

In addition, in the present embodiment, the inverter 20 corresponds to both a "high heat generation circuit" and an "electric power converter".

During operation of the rotating electric machine 10 in the motor mode or the generator mode, the controller 30 acquires detected values of parameters from various sensors. These sensors include, for example, a voltage sensor 21 for detecting the terminal voltage of the battery 40, a phase current sensor (not shown) for detecting electric current flowing in each phase winding of the stator coil 14 of the rotating electric machine 10 and a rotation angle sensor (not shown) for detecting the rotation angle of the rotating electric machine 10. Then, based on the detected values acquired from the sensors, the controller 30 generates control signals for controlling the on/off of the switches 22 and 23 of the inverter 20 and outputs the generated control signals respectively to the switches 22 and 23. Consequently, the inverter 20 energizes each of the phase windings of the stator coil 14 according to the control signals from the controller 30.

More specifically, for each of the three switch pairs of the inverter 20 respectively corresponding to the U, V, and W phases, the control signal for controlling the on/off of the upper-arm switch 22 (i.e., switching element 22a, 22b or 22c) of the pair and the control signal for controlling the on/off of the lower-arm switch 23 (i.e., switching element 23a, 23b or 23c) are complementary to each other. Consequently, the upper-arm and lower-arm switches 22 and 23 of the pair are turned on alternately with each other.

Moreover, based on the detected values acquired from the sensors, the controller 30 determines the operating state of the rotating electric machine 10. More specifically, the controller 30 determines whether the rotating electric machine 10 is in a low-speed rotation state or a high-speed rotation state. Then, based on the determined operating state of the rotating electric machine 10, the controller 30 generates control signals for controlling the on/off of the switches 32 and 33 of the winding switching circuit 50 and outputs the generated control signals respectively to the switches 32 and 33. Consequently, the second winding sections 16 of the phase windings of the stator coil 14 are switched by the winding switching circuit 50 between an energized state and a de-energized state.

More specifically, for each of the phase windings of the stator coil 14, the control signal for controlling the on/off of the first switch 32 (i.e., switching element 32a, 32b or 32c) corresponding to the phase winding and the control signal for controlling the on/off of the second switch 33 (i.e., switching element 33a, 33b or 33c) corresponding to the phase winding are complementary to each other. Consequently, the first and second switches 32 and 33 corresponding to the phase winding are turned on alternately with each other.

In the present embodiment, when the rotating electric machine 10 is in the low-speed rotation state, the first switches 32 of the winding switching circuit 50 are kept in an on-state whereas the second switches 33 of the winding switching circuit 50 are kept in an off-state. Consequently, in each phase winding of the stator coil 14, both the first and second winding sections 15 and 16 are kept in the energized state. Moreover, the phase windings of the stator coil 40 are electrically connected with each other at the first neutral point Np1. On the other hand, when the rotating electric machine 10 is in the high-speed rotation state, the first switches 32 of the winding switching circuit 50 are kept in an off-state whereas the second switches 33 of the winding switching circuit 50 are kept in an on-state. Consequently, in each phase winding of the stator coil 14, only the first winding section 15 is kept in the energized state (i.e., the second winding section 16 is kept in the de-energized state). Moreover, the phase windings of the stator coil 40 are electrically connected with each other at the second neutral point Np2.

That is, in the present embodiment, the first winding sections 15 of the phase windings of the stator coil 14 are always kept in the energized state regardless of the operating state of the rotating electric machine 10. In contrast, the second winding sections 16 of the phase windings of the stator coil 14 are kept in the energized state only when the rotating electric machine 10 is in the low-speed rotation state. Moreover, the phase windings of the stator coil 40 are electrically connected with each other at a selected one of the first and second neutral points Np1 and Np2 depending on the operating state of the rotating electric machine 10.

In addition, in the present embodiment, the low-speed rotation state corresponds to a "specific operating state" of the rotating electric machine 10.

Referring now to FIG. 2, the rotating electric machine 10 has a rotating shaft 25 rotatably supported by a pair of bearings 27 provided in a hollow cylindrical housing 26. Moreover, in the housing 26, there is received the rotor 11 that is hollow cylindrical in shape and fixed on the rotating shaft 25. On a radially inner periphery of the housing 26, there is provided the stator 13 that is hollow cylindrical in shape and located radially outside the rotor 11.

It should be noted that for the sake of simplicity, the controller 30 is not shown in FIG. 2.

The stator coil 14 is wound on the stator core 18 to have a plurality of turn portions each protruding axially outward from a corresponding one of axial end faces 18A and 18B of the stator core 18. The turn portions of the stator coil 14 together form annular coil end parts 14A and 14B (see FIG. 2) that protrude axially outward respectively from the axial end faces 18A and 18B of the stator core 18.

Figure 3:
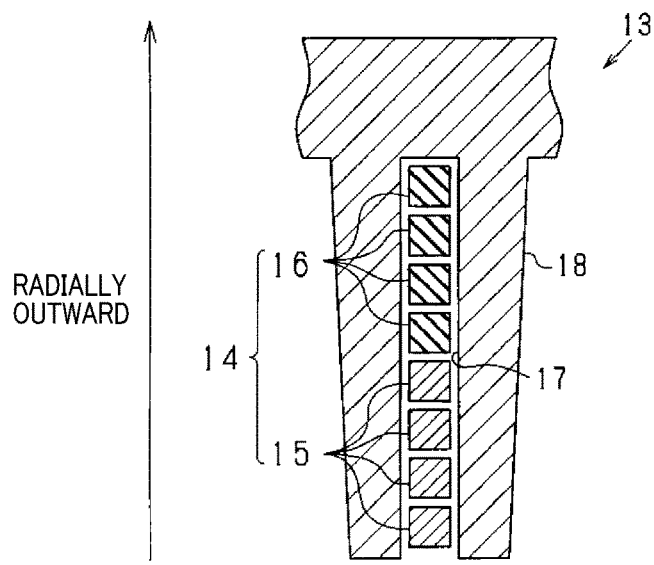
FIG. 3 is a cross-sectional view of part of a stator of a rotating electric machine included in the rotating electric machine unit according to the first embodiment.

As shown in FIG. 3, in the stator core 18, there are formed a plurality of slots 17 that each radially extend and are circumferentially spaced at predetermined intervals. In each of the slots 17, there is received the stator coil 14 in a plurality of radially-aligned layers. Specifically, the first winding sections 15 of the phase windings of the stator coil 14 are received in radially inner parts of the slots 17, while the second winding sections 16 of the phase windings of the stator coil 14 are received in radially outer parts of the slots 17. That is, the first and second winding sections 15 and 16 of the phase windings of the stator coil 14 are received in the slots 17 of the stator core 18 so that at least part of the first winding sections 15 are located radially inside the second winding sections 16. More particularly, in the present embodiment, the entire first winding sections 15 are located radially inside the second winding sections 16.

Consequently, as shown in FIG. 2, the coil end parts 14A and 14B of the stator coil 14 include first coil end parts 15A and 15B and second coil end parts 16A and 16B. The first coil end parts 15A and 15B are formed of the turn portions of the first winding sections 15 of the phase windings of the stator coil 14. The second coil end parts 16A and 16B are formed of the turn portions of the second winding sections 16 of the phase windings of the stator coil 14. Moreover, the first coil end parts 15A and 15B are respectively located radially inside the second coil end parts 16A and 16B.

In operation, the rotating electric machine 10 generates heat due to energy losses. The energy losses include copper loss, iron loss and mechanical loss. Moreover, the inverter 20 and the winding switching circuit 50 also generate heat due to the switching and energization of the switches 22, 23, 32 and 33.

In the present embodiment, a cooling device is provided in the rotating electric machine unit 100 to suppress the temperatures of the rotating electric machine 10, the inverter 20 and the winding switching circuit 50 from being excessively increased due to the heat generated by them.

Specifically, the cooling device includes an inverter cooler 61 configured to cool the inverter 20, a switching circuit cooler 62 configured to cool the winding switching circuit 50 and a first-coolant supplier 60 configured to supply a first coolant to both the inverter cooler 61 and the switching circuit cooler 62.

In addition, in the present embodiment, the first coolant is implemented by cooling water. Both the inverter cooler 61 and the switching circuit cooler 62 together correspond to a "first cooler". Moreover, the switching circuit cooler 62 corresponds to a "low heat generation circuit-cooling part of the first cooler".

Figure 4:
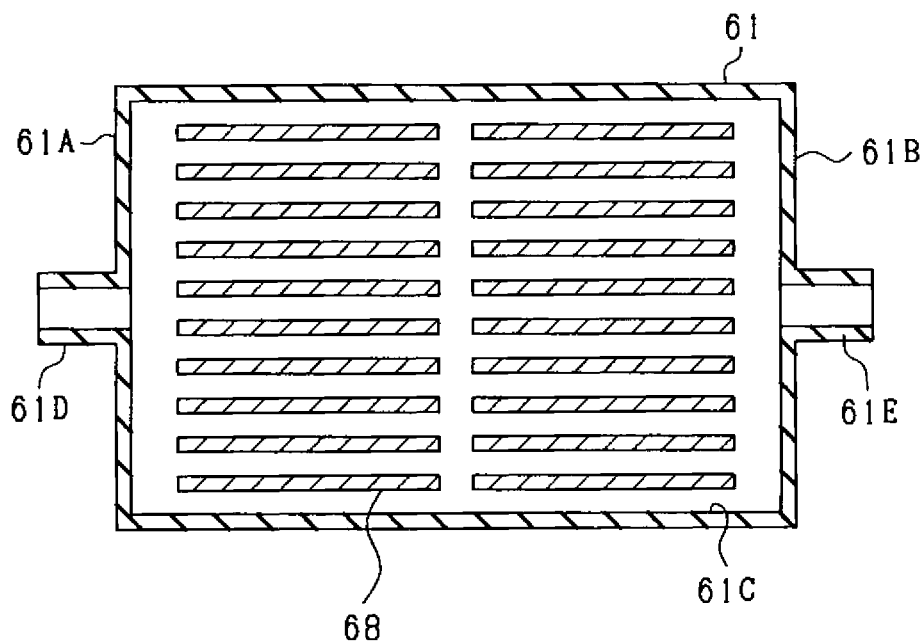
FIG. 4 is a cross-sectional view of an inverter cooler of the rotating electric machine unit according to the first embodiment.

FIG. 4 shows a cross section of the inverter cooler 61 perpendicular to a thickness direction thereof (i.e., the direction perpendicular to the paper surface of FIG. 4). The inverter cooler 61 has the shape of a rectangular cuboid which has a smaller dimension in the thickness direction than both in a longitudinal direction thereof (i.e., the horizontal direction in FIG. 4) and in a width direction thereof (i.e., the vertical direction in FIG. 4).

The inverter cooler 61 has an internal space 61C formed therein. Moreover, the inverter cooler 61 also has a pair of side walls 61A and 61B opposed to each other in the longitudinal direction and a pair of openings 61D and 61E formed to respectively penetrate the pair of side walls 61A and 61B. In operation, the first coolant flows into and out of the internal space 61C of the inverter cooler 61 via the openings 61D and 61E.

In the internal space 61C of the inverter cooler 61, there are formed a plurality of fins 68 as a heat absorption mechanism for absorbing external heat (or heat from the outside of the inverter cooler 61). The fins 68 are formed, for example of an aluminum alloy having high heat conductivity, into a substantially plate shape. Each of the fins 68 protrudes from a side wall of the inverter cooler 61 on one side in the thickness direction into the internal space 61C. Moreover, each of the fins 68 extends parallel to the longitudinal direction of the inverter cooler 61.

The switching circuit cooler 62 has a similar structure to the inverter cooler 61. Therefore, for the sake of avoiding repetition, description of the structure of the switching circuit cooler 62 is omitted hereinafter.

As shown in FIG. 2, the inverter cooler 61 is arranged to have the inverter 20 superposed thereon in the thickness direction thereof (i.e., the vertical direction in FIG. 2). The inverter 20 and the inverter cooler 61 together constitute an inverter unit 28. The inverter unit 28 is fixed to a side wall 26A of the housing 26, which extends parallel to the axial direction of the housing 26, with the inverter cooler 61 located on the side wall 26A.

Similarly, the switching circuit cooler 62 is arranged to have the winding switching circuit 50 superposed thereon in the thickness direction thereof (i.e., the horizontal direction in FIG. 2). The winding switching circuit 50 and the switching circuit cooler 62 together constitute a switching circuit unit 58. The switching circuit unit 58 is fixed to an axial end wall 26B (i.e., the left end wall in FIG. 2) of the housing 26, with the switching circuit cooler 62 located on the axial end wall 26B side.

The first-coolant supplier 60 includes: a first first-coolant flow path 63 via which the first coolant flows into the inverter cooler 61; a second first-coolant flow path 64 via which the first coolant flowing out of the inverter cooler 61 further flows into the switching circuit cooler 62; a third first-coolant flow path 65 via which the first coolant flowing out of the switching circuit cooler 62 further flows to return to the inverter cooler 61 side; a first-coolant pump 66 provided in the third first-coolant flow path 65 to pressurize the first coolant; and a radiator 67 provided between the first-coolant pump 66 and the inverter cooler 61 to cool the first coolant.

Moreover, the cooling device further includes a machine cooler 70 configured to cool the rotating electric machine 10 and a second-coolant supplier 80 configured to supply a second coolant to the machine cooler 70.

In addition, in the present embodiment, the second coolant is implemented by lubricating oil. The machine cooler 70 corresponds to a "second cooler".

The machine cooler 70 is constituted of the rotating shaft 25 and the rotor 11. Specifically, at a central part of an axial end face 25A (i.e., the left end face in FIG. 2) of the rotating shaft 25, there is formed an axial hole 71 that axially extends to such an extent as not to penetrate the rotating shaft 25. Moreover, in the rotor 11, there are formed a plurality of through-holes 72 each of which axially extends to penetrate the rotor 11. Consequently, in axial end faces 11A and 11B of the rotor 11, there are formed openings 73 and 74 each of which corresponds to one of the through-holes 72. Furthermore, in the rotating shaft 25 and the rotor 11, there are formed a plurality of connection holes 75 each of which radially extends to fluidically connect the axial hole 71 formed in the rotating shaft 25 and one of the through-holes 72 formed in the rotor 11.

In addition, in the present embodiment, the axial hole 71 corresponds to an "in-shaft flow path". The through-holes 72 and the connection holes 75 together correspond to "in-rotor flow paths".

In operation, the second coolant is supplied by the second-coolant supplier 80 to flow into the axial hole 71. Then, the second coolant further flows from the axial hole 71 into the through-holes 72 via the connection holes 75, cooling the rotor 11. Thereafter, the second coolant flows out of the through-holes 72 via the openings 73 and 74. Further, with rotation of the rotor 11, the second coolant flowing out of the through-holes 72 is discharged radially outward by the centrifugal force onto the coil end parts 14A and 14B of the stator coil 14, thereby cooling the coil end parts 14A and 14B.

As described previously, in the present embodiment, in the coil end parts 14A and 14B of the stator coil 14, the first coil end parts 15A and 15B formed of the turn portions of the first winding sections 15 of the phase windings of the stator coil 14 are located radially inside the second coil end parts 16A and 16B formed of the turn portions of the second winding sections 16 of the phase windings of the stator coil 14. Therefore, in the coil end parts 14A and 14B of the stator coil 14, the first coil end parts 15A and 15B are preferentially cooled by the second coolant.

Figure 5:
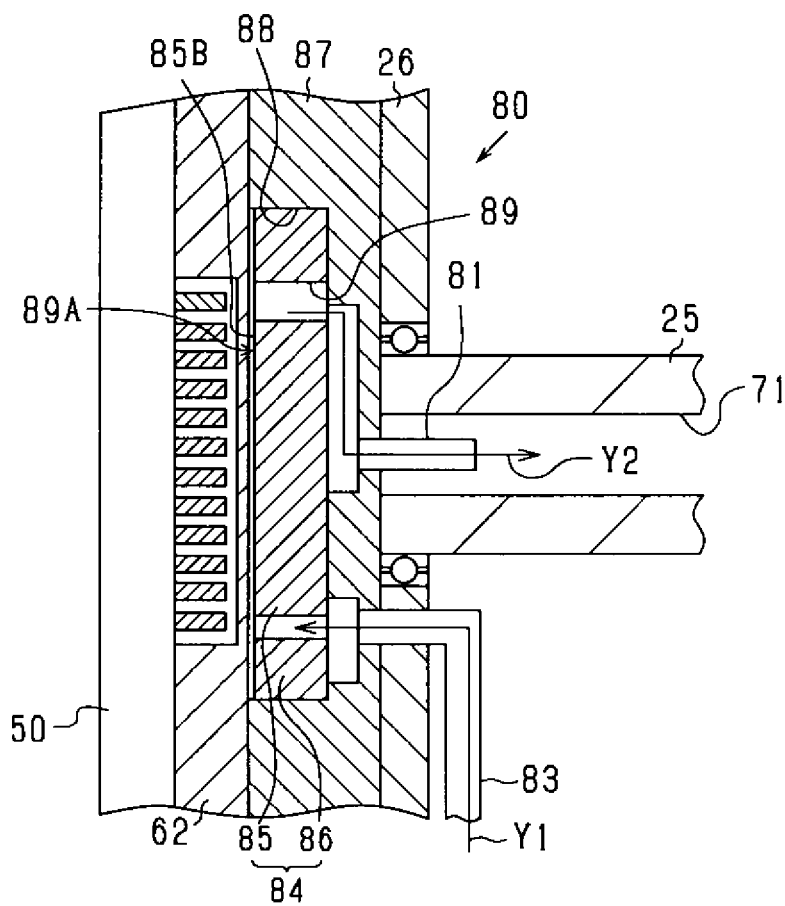
FIG. 5 is a cross-sectional view illustrating the configuration of a second-coolant supplier of the rotating electric machine unit according to the first embodiment.

Referring to FIGS. 2 and 5, the second-coolant supplier 80 includes: a first second-coolant flow path 81 via which the second coolant flows into the axial hole 71; a second-coolant reservoir 82 provided in the housing 26 to collect the second coolant flowing out of the through-holes 72; a second second-coolant flow path 83 via which the second coolant flows out of the second-coolant reservoir 82; and a second-coolant pump 84 provided between the first and second second-coolant flow paths 81 and 83 to pressurize the second coolant.

Figure 6:
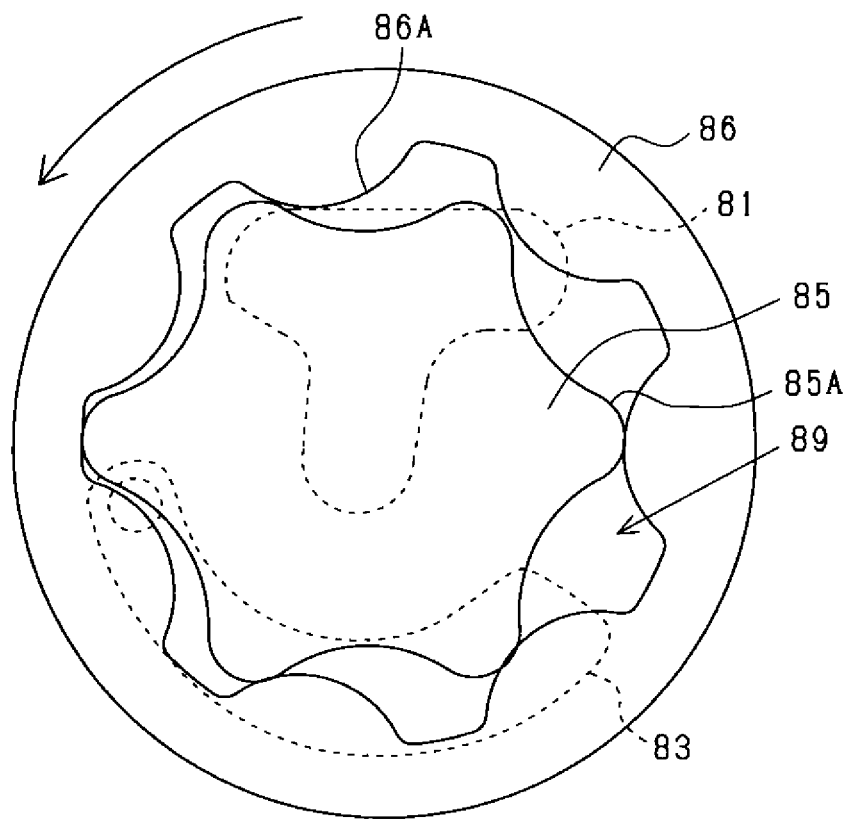
FIG. 6 is a side view illustrating the configuration of a second-coolant pump included in the second-coolant supplier.

In the present embodiment, the second-coolant pump 84 is implemented by a trochoid pump. Specifically, as shown in FIGS. 5 and 6, the second-coolant pump 84 includes a cylindrical casing 87 and both an inner rotor 85 and an outer rotor 86 received in the casing 87. The inner rotor 85 has a plurality of external teeth 85A formed at predetermined intervals on an outer periphery thereof. In contrast, the outer rotor 86 has a plurality of internal teeth 86A formed at predetermined intervals on an inner periphery thereof. The number of the external teeth 85A of the inner rotor 85 is less than the number of the internal teeth 86A of the outer rotor 86 by one.

In the casing 87, there is formed a circular hole 88 coaxially with the rotating shaft 25. The outer rotor 86 is rotatably fitted in the circular hole 88. The inner rotor 85 is arranged radially inside and eccentrically to the outer rotor 86. Between the external teeth 85A of the inner rotor 85 and the internal teeth 86A of the outer rotor 86, there are formed a plurality of spaces 89 by the engagement or contact between the external teeth 85A and the internal teeth 86A. In operation, with rotation of the inner and outer rotors 85 and 86, the volumes of the spaces 89 are increased and decreased, thereby causing the second coolant to flow into the spaces 89 as indicated with an arrow Y1 in FIG. 5 and to flow out of the spaces 89 as indicated with an arrow Y2 in FIG. 5. Consequently, the second coolant can circulate through the first second-coolant flow path 81, the axial hole 71, the connection holes 75, the through-holes 72, the second-coolant reservoir 82 and the second second-coolant flow path 83.

In the present embodiment, the second-coolant pump 84 is formed integrally with the switching circuit cooler 62 to have an axial end face 85B (i.e., the left end face in FIG. 5) of the inner rotor 85 located adjacent to the switching circuit cooler 62. In a minute gap 89A formed between the axial end face 85B of the inner rotor 85 and the switching circuit cooler 62, there is retained the lubricating oil. That is, the axial end face 85B of the inner rotor 85 and the switching circuit cooler 62 are located adjacent to each other with a thin oil film formed therebetween.

Consequently, the second coolant sucked into the spaces 89 is cooled by the switching circuit cooler 62 as well as by the inner rotor 85 that is cooled by the switching circuit cooler 62. That is, the second-coolant pump 84 also functions as a heat exchanger to transfer heat between the first and second coolants.

Figure 7:
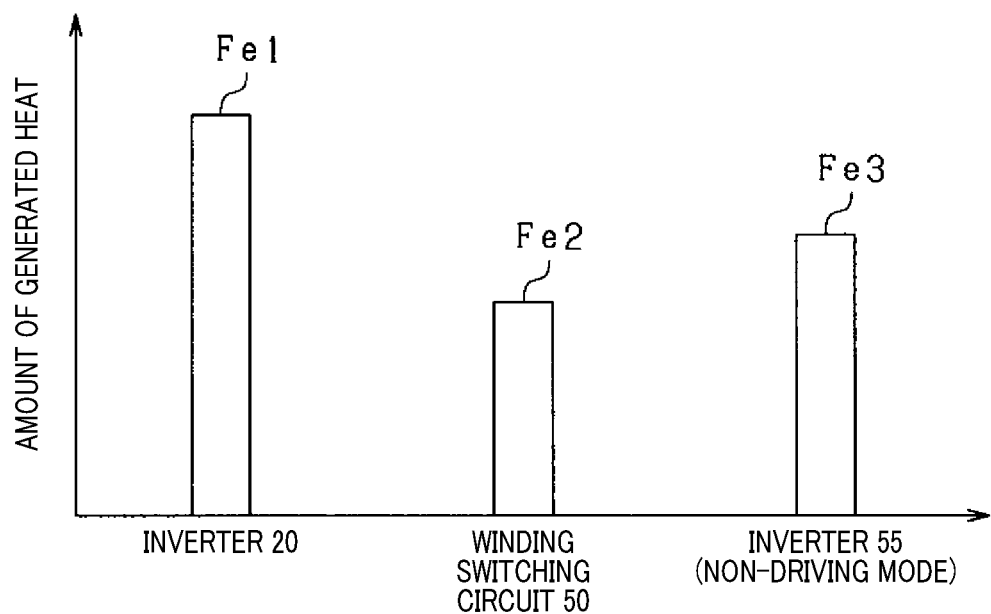
FIG. 7 is a bar chart giving a comparison between the amount of heat generated by an inverter and the amount of heat generated by a winding switching circuit.

FIG. 7 gives a comparison between the amount of heat generated by the inverter 20 and the amount of heat generated by the winding switching circuit 50 during operation of the rotating electric machine 10.

As can be seen from FIG. 7, the amount Fe2 of heat generated by the winding switching circuit 50 is less than the amount Fe1 of heat generated by the inverter 20. The reason is as follows.

In operation, the switching elements 32a-32c and 33a-33c included in the winding switching circuit 50 are turned on or off only when the operating state of the rotating electric machine 10 is changed, for example, from the low-speed rotation state to the high-speed rotation state or vice versa. In contrast, the switching elements 22a-22c and 23a-23c included in the inverter 20 are constantly turned on or off. That is, the frequency of switching of the switching elements 32a-32c and 33a-33c included in the winding switching circuit 50 is lower than the frequency of switching of the switching elements 22a-22c and 23a-23c included in the inverter 20.

Therefore, when the first coolant is supplied by the first-coolant supplier 60 to the inverter cooler 61 and the switching circuit cooler 62 to cool the inverter 20 and the winding switching circuit 50, there is an excess of the cooling capacity of the switching circuit cooler 62. This excess of the cooling capacity of the switching circuit cooler 62 is due to the difference between the amount Fe2 of heat generated by the winding switching circuit 50 and the amount Fe1 of heat generated by the inverter 20.

Moreover, the cooling capacity of the switching circuit cooler 62 is set to be high so as to sufficiently cool the winding switching circuit 50 during the change of the operating state of the rotating electric machine 10. Therefore, when the rotating electric machine 10 operates without changing its operating state, there is an excess of the cooling capacity of the switching circuit cooler 62.

In consideration of the above, in the present embodiment, the rotating electric machine unit 100 is configured to cool the rotating electric machine 10 utilizing the excess cooling capacity of the switching circuit cooler 62. Specifically, the second-coolant supplier 80 includes the second-coolant pump 84 that is formed integrally with the switching circuit cooler 62. By the second-coolant pump 84, heat exchange is made between the first and second coolants and the second coolant is supplied to the machine cooler 70. Consequently, it becomes possible to cool the second coolant utilizing the excess cooling capacity of the switching circuit cooler 62 and to cool the rotating electric machine 10 using the thus-cooled second coolant.

According to the present embodiment, it is possible to achieve the following advantageous effects.

In the present embodiment, the rotating electric machine 10 is cooled by utilizing the excess cooling capacity of the switching circuit cooler 62. Consequently, it becomes possible to suitably cool the rotating electric machine 10 without employing any separate cooler from the switching circuit cooler 62 or to suitably cool the rotating electric machine 10 while suppressing the cooling capacity of such a separate cooler.

More particularly, in the present embodiment, the second-coolant pump 84 is formed integrally and thus in abutment with the switching circuit cooler 62. Consequently, the second-coolant pump 84 is cooled by the switching circuit cooler 62, thus being prevented from heat damage. Moreover, the second-coolant pump 84 also functions as a heat exchanger to transfer heat between the first and second coolants, thereby suitably cooling the second coolant and thus the rotating electric machine 10.

In the present embodiment, the second-coolant pump 84, which is implemented by a trochoid pump, includes the inner rotor 85 and the outer rotor 86. The second-coolant pump 84 is configured to increase and decrease the volumes of the spaces 89 defined by the inner and outer rotors 85 and 86, thereby causing the second coolant to flow into and out of the spaces 89. Moreover, the axial end face 85B of the inner rotor 85 is arranged adjacent to the switching circuit cooler 62 with the thin oil film formed therebetween. Consequently, with the inner rotor 85 cooled by the switching circuit cooler 62, it is possible to cool the second coolant while agitating the same by the inner rotor 85. As a result, with the thus-cooled second coolant, it is possible to suitably cool the rotating electric machine 10.

In the rotating electric machine 10, the rotor 11 is located radially inside the stator 13. Therefore, it is more difficult for the rotor 11 to be cooled by heat dissipation than it is for the stator 13. In consideration of the above, in the present embodiment, the second coolant, which is cooled by the switching circuit cooler 62, is supplied to flow through the axial hole 71 formed in the rotating shaft 25 and the connection holes 75 and the through-holes 71 formed in the rotor 11. Consequently, it becomes possible to suitably cool the rotor 11 using the second coolant.

In the present embodiment, the second coolant, which has flowed into the through-holes 72 of the rotor 11, is discharged from the through-holes 72 via the openings 73 and 74 formed in the axial end faces 11A and 11B of the rotor 11. Further, with rotation of the rotor 11, the second coolant is discharged radially outward by the centrifugal force onto the coil end parts 14A and 14B of the stator coil 14 that are located radially outside the rotor 11. Consequently, it becomes possible to suitably cool the stator coil 14 using the second coolant.

In the present embodiment, when the rotating electric machine 10 is in the low-speed rotation state, both the first and second winding sections 15 and 16 are kept in the energized state in each of the phase windings of the stator coil 14. On the other hand, when the rotating electric machine 10 is in the high-speed rotation state, only the first winding section 15 is kept in the energized state in each of the phase windings of the stator coil 14. That is, the first winding sections 15 of the phase windings of the stator coil 14 are always kept in the energized state regardless of the operating state of the rotating electric machine 10. In contrast, the second winding sections 16 of the phase windings of the stator coil 14 are kept in the energized state only when the rotating electric machine 10 is in the low-speed rotation state. Therefore, the amount of heat generated by the first winding sections 15 of the phase windings of the stator coil 14 is greater than the amount of heat generated by the second winding sections 16 of the phase windings of the stator coil 14. Accordingly, in terms of more suitably cooling the rotating electric machine 10, it is preferable to preferentially cool the first winding sections 15 in the phase windings of the stator coil 14.

In consideration of the above, in the present embodiment, the first and second winding sections 15 and 16 of the phase windings of the stator coil 14 are received in the slots 17 of the stator core 18 so that at least part of the first winding sections 15 are located radially inside the second winding sections 16. Accordingly, in the coil end parts 14A and 14B of the stator coil 14, at least part of the first coil end parts 15A and 15B, which are formed of the turn portions of the first winding sections 15, are located radially inside the second coil end parts 16A and 16B that are formed of the turn portions of the second winding sections 16. Consequently, it becomes possible to preferentially cool the first winding sections 15 in the phase windings of the stator coil 14 using the second coolant, thereby more suitably cooling the rotating electric machine 10.

More particularly, in the present embodiment, the first and second winding sections 15 and 16 of the phase windings of the stator coil 14 are received in the slots 17 of the stator core 18 so that the entire first winding sections 15 are located radially inside the second winding sections 16. Accordingly, in the coil end parts 14A and 14B of the stator coil 14, the entire first coil end parts 15A and 15B are located radially inside the second coil end parts 16A and 16B. Consequently, it becomes possible to more suitably cool the stator 13 using the second coolant. As a result, it becomes possible to suitably cool the rotating electric machine 10 without employing any stator cooler that cools the stator 13 from the radially outer side or to suitably cool the rotating electric machine 10 while suppressing the cooling capacity of such a stator cooler.

Second Embodiment

A rotating electric machine unit 100 according to the second embodiment has a similar structure to the rotating electric machine 100 according to the first embodiment. Accordingly, only the differences therebetween will be described hereinafter.

In the first embodiment, the first and second winding sections 15 and 16 of the phase windings of the stator coil 14 are received in the slots 17 of the stator core 18 so that the entire first winding sections 15 are located radially inside the second winding sections 16 (see FIG. 3).

Figure 8:
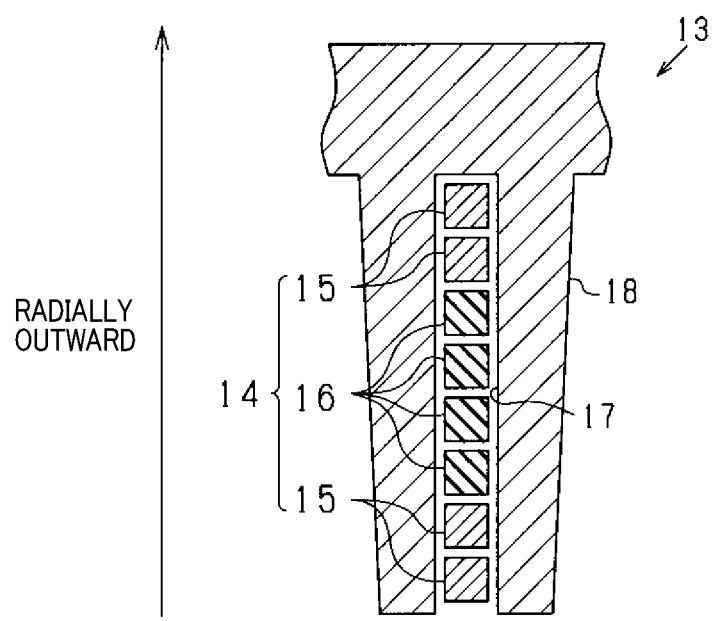
FIG. 8 is a cross-sectional view of part of a stator of a rotating electric machine included in a rotating electric machine unit according to a second embodiment.

In contrast, in the present embodiment, as shown in FIG. 8, the second winding sections 16 of the phase windings of the stator coil 14 are received in radially central parts of the slots 17 of the stator core 18, while the first winding sections 15 of the phase windings of the stator coil 14 are received in both radially inner parts and radially outer parts of the slots 17. That is, the first and second winding sections 15 and 16 of the phase windings of the stator coil 14 are received in the slots 17 of the stator core 18 so that part of the first winding sections 15 are located radially inside the second winding sections 16 and the remainder of the first winding sections 15 are located radially outside the second winding sections 16.

Moreover, as described in the first embodiment, in the coil end parts 14A and 14B of the stator coil 14, the first coil end parts 15A and 15B are formed of the turn portions of the first winding sections 15 of the phase windings of the stator coil 14 while the second coil end parts 16A and 16B are formed of the turn portions of the second winding sections 16 of the phase windings of the stator coil 14. Accordingly, in the coil end parts 14A and 14B of the stator coil 14, part of the first coil end parts 15A and 15B are located radially inside the second coil end parts 16A and 16B and the remainder of the first coil end parts 15A and 15B are located radially outside the second coil end parts 16A and 16B.

With the above configuration of the stator coil 14 according to the present embodiment, it is possible to preferentially cool, using the second coolant, that part of the first winding sections 15 which is located radially inside the second winding sections 16, thereby suitably cooling the rotating electric machine 10.

Moreover, with the above configuration, it is also possible to preferentially cool, by heat transfer to the housing 26 (see FIG. 2) via the stator core 18, the remainder of the first winding sections 15 which are located radially outside the second winding sections 16, thereby suitably cooling the rotating electric machine 10.

Third Embodiment

A rotating electric machine unit 100 according to the third embodiment has a similar structure to the rotating electric machine 100 according to the first embodiment. Accordingly, only the differences therebetween will be described hereinafter.

In the first embodiment, the rotating electric machine unit 100 includes the rotating electric machine 10, the inverter 20, the controller 30 and the winding switching circuit 50. Moreover, each of the phase windings of the stator coil 14 includes the first and second winding sections 15 and 16 that are connected in series with each other. Furthermore, the phase windings of the stator coil 40 are electrically connected with each other at a selected one of the first and second neutral points Np1 and Np2 depending on the operating state of the rotating electric machine 10 (see FIG. 1).

Figure 9:
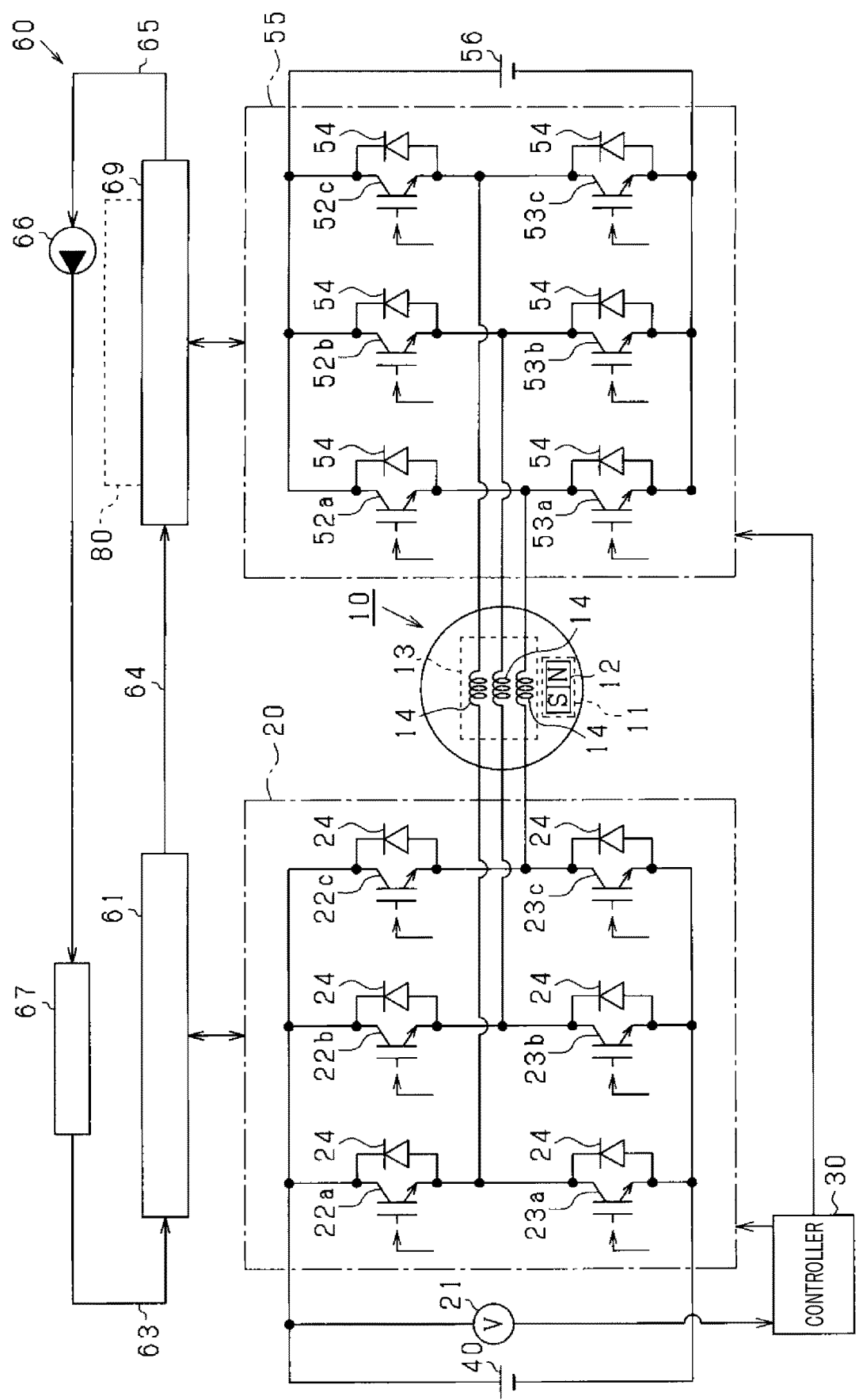
FIG. 9 is a schematic circuit diagram of a rotating electric machine unit according to a third embodiment.

In contrast, in the present embodiment, as shown in FIG. 9, the rotating electric machine unit 100 includes an inverter 55 instead of the winding switching circuit 50. That is, in the present embodiment, the rotating electric machine unit 100 includes the rotating electric machine 10, the inverter 20, the controller 30 and the inverter 55.

Accordingly, in the present embodiment, the cooling device includes, instead of the switching circuit cooler 62, an inverter cooler 69 configured to cool the inverter 55. In addition, the second-coolant supplier 80 is formed integrally with the inverter cooler 69 instead of the switching circuit cooler 62.

Moreover, in the present embodiment, each of the phase windings of the stator coil 14 includes only one winding section.

Furthermore, in the present embodiment, there is no neutral point defined in the stator 13. Instead, the inverter 55 defines a neutral point at which the phase windings of the stator coil 14 are electrically connected with each other.

Specifically, in the present embodiment, as shown in FIG. 9, the stator coil 14 is electrically connected, via the inverter 55, to a battery 56 which is a DC power source. The battery 56 outputs a DC voltage of, for example, 200V or higher.

In the present embodiment, the battery 56 is an assembled battery in which a plurality of lithium ion storage batteries are connected in series with each other. It should be noted that the battery 56 may alternatively be implemented by other storage batteries.

The inverter 55 includes three switch pairs respectively corresponding to the U, V, and W phases. Each of the switch pairs consists of an upper-arm (or high-potential-side) switch 52 and a lower-arm (or low-potential-side) switch 53 that are connected in series with each other. The upper-arm switches 52 of the three switch pairs are respectively constituted of switching elements 52a, 52b and 52c. Similarly, the lower-arm switches 53 of the three switch pairs are respectively constituted of switching elements 53a, 53b and 53c. Moreover, the three switch pairs are connected in parallel with each other.

For each of the U, V and W phases, to a node (or junction point) between the upper-arm and lower-arm switches 52 and 53 of the switch pair corresponding to the phase, there is connected one of the phase windings of the stator coil 14 which corresponds to the phase.

In the present embodiment, each of the switching elements 52a-52c and 53a-53c is implemented by a voltage-controlled semiconductor switching element, more particularly by an IGBT. Moreover, each of the switching elements 52a-52c and 53a-53c has a freewheeling diode 54 connected in antiparallel thereto.

In addition, in the present embodiment, the inverter 55 corresponds to a "low heat generation circuit" while the inverter 20 corresponds to a "high heat generation circuit".

In the present embodiment, the controller 30 switches, according to the operating state of the rotating electric machine 10, the control mode of the inverter 55 between a driving mode and a non-driving mode.

In the driving mode, the controller 30 controls the inverter 55 so that: for each of the U, V and W phases, the upper-arm switch 52 of the inverter 55 corresponding to the phase is turned on when the lower-arm switch 23 of the inverter 20 corresponding to the phase is turned off; the upper-arm switch 52 of the inverter 55 corresponding to the phase is turned off when the lower-arm switch 23 of the inverter 20 corresponding to the phase is turned on; the lower-arm switch 53 of the inverter 55 corresponding to the phase is turned on when the upper-arm switch 22 of the inverter 20 corresponding to the phase is turned off; and the lower-arm switch 53 of the inverter 55 corresponding to the phase is turned off when the upper-arm switch 22 of the inverter 20 corresponding to the phase is turned on. Therefore, the frequency of switching of the switching elements 52a-52c and 53a-53c included in the inverter 55 is substantially equal to the frequency of switching of the switching elements 22a-22c and 23a-23c included in the inverter 20. Consequently, in the driving mode, the amount Fe3 of heat generated by the inverter 55 is substantially equal to the amount Fe1 of heat generated by the inverter 20.

On the other hand, in the non-driving mode, the controller 30 controls the inverter 55 so that: all the upper-arm switches 52 of the inverter 55 are simultaneously turned on when all the lower-arm switches 53 of inverter 55 are simultaneously turned off; and all the upper-arm switches 52 of the inverter 55 are simultaneously turned off when all the lower-arm switches 53 of inverter 55 are simultaneously turned on. Moreover, the switching elements 52$a$-52$c$ and 53$a$-53$c$ included in the inverter 55 are not constantly turned on or off. In contrast, the switching elements 22$a$-22$c$ and 23$a$-23$c$ included in the inverter 20 are constantly turned on or off. That is, the frequency of switching of the switching elements 52$a$-52$c$ and 53$a$-53$c$ included in the inverter 55 is lower than the frequency of switching of the switching elements 22$a$-22$c$ and 23$a$-23$c$ included in the inverter 20. Consequently, in the non-driving mode, the amount Fe3 of heat generated by the inverter 55 is less than the amount Fe1 of heat generated by the inverter 20 (see FIG. 7).

Therefore, when the first coolant is supplied by the first-coolant supplier 60 to the inverter coolers 61 and 69 to cool the inverters 20 and 55, there is an excess of the cooling capacity of the inverter cooler 69.

In consideration of the above, in the present embodiment, the rotating electric machine unit 100 is configured to cool the rotating electric machine 10 utilizing the excess cooling capacity of the inverter cooler 69. Consequently, it becomes possible to suitably cool the rotating electric machine 10 without employing any separate cooler from the inverter cooler 69 or to suitably cool the rotating electric machine 10 while suppressing the cooling capacity of such a separate cooler.

Fourth Embodiment

A rotating electric machine unit 100 according to the fourth embodiment has a similar structure to the rotating electric machine 100 according to the first embodiment. Accordingly, only the differences therebetween will be described hereinafter.

In the first embodiment, the inverter 20 and the inverter cooler 61 together constitute the inverter unit 28. The inverter unit 28 is fixed to the side wall 26A of the housing 26, which extends parallel to the axial direction of the housing 26, with the inverter cooler 61 located on the side wall 26A. On the other hand, the winding switching circuit 50 and the switching circuit cooler 62 together constitute the switching circuit unit 58. The switching circuit unit 58 is fixed to the axial end wall 26B of the housing 26, with the switching circuit cooler 62 located on the axial end wall 26B side. That is, the inverter unit 28 and the switching circuit unit 58 are arranged separately from each other (see FIG. 2).

Figure 10:
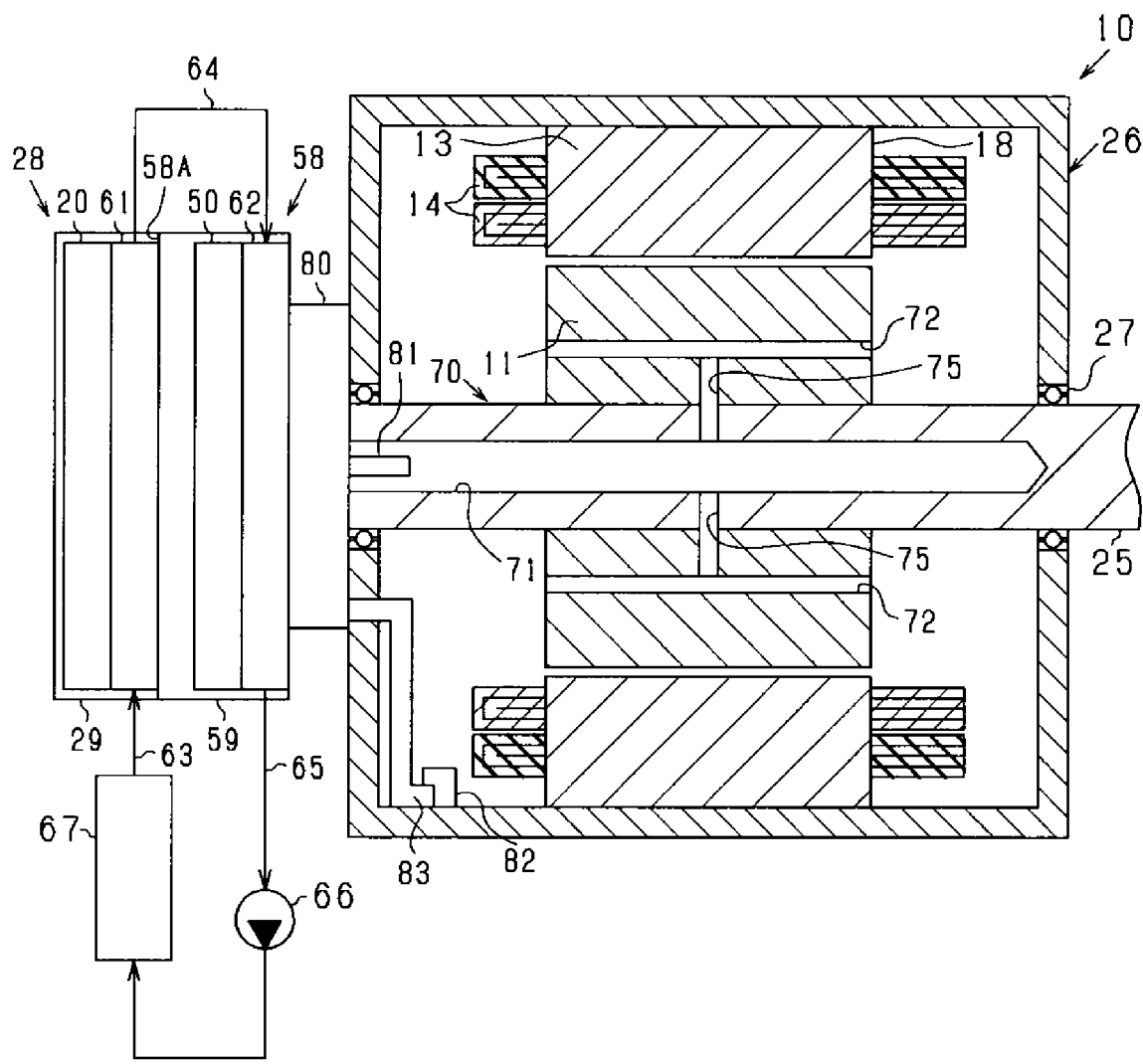
FIG. 10 is a schematic cross-sectional view of a rotating electric machine unit according to a fourth embodiment, omitting a controller of the rotating electric machine unit.

In contrast, in the present embodiment, as shown in FIG. 10, the inverter unit 28 and the switching circuit unit 58 are stacked together.

Specifically, in the present embodiment, the inverter unit 28 further includes a cover 29 that covers both the inverter 20 and the inverter cooler 61. Similarly, the switching circuit unit 58 further includes a cover 59 that covers both the winding switching circuit 50 and the switching circuit cooler 62. Moreover, the inverter unit 28 is fixed to a side surface 58A of the switching circuit unit 58 on the opposite side to the rotating electric machine 10, with the inverter cooler 61 located on the side surface 58A. Consequently, the switching circuit unit 58 and the inverter unit 28 are stacked in this order from the rotating electric machine 10 side.

With the above arrangement, the switching circuit unit 58 is interposed between the inverter unit 28 and the rotating electric machine 10. As described in the first embodiment, the winding switching circuit 50 included in the switching circuit unit 58 generates less heat than the inverter 20 included in the inverter unit 28. Therefore, with the switching circuit unit 58 interposed between the inverter unit 28 and the rotating electric machine 10, it is possible to suppress interaction between the heat generated by the inverter unit 28 and the heat generated by the rotating electric machine 10.

While the above particular embodiments have been shown and described, it will be understood by those skilled in the art that various modifications, changes, and improvements may be made without departing from the spirit of the present disclosure.

For example, the low heat generation circuit is implemented by the winding switching circuit 50 in the first embodiment and by the inverter 55 in the third embodiment. Alternatively, the low heat generation circuit may be implemented by other electric circuits, such as a contactless power receiving and supplying circuit that receives and supplies electric power from and to an external device or circuit in a contactless manner.

In the above-described embodiments, the inverter cooler 61 and the switching circuit cooler 62 (or the inverter cooler 69) are fluidically connected in series with each other by the first-coolant flow paths 63-65 of the first-coolant supplier 60. Alternatively, the inverter cooler 61 and the switching circuit cooler 62 (or the inverter cooler 69) may be fluidically connected in parallel with each other. In this case, the flow resistances of first-coolant flow paths may be set, based on the difference between the amount Fe1 of heat generated by the inverter 20 and the amount Fe2 of heat generated by the winding switching circuit 50 (or the amount Fe3 of heat generated by the inverter 55), so that the flow resistance of the first-coolant path via which the first coolant flows into the switching circuit cooler 62 (or the inverter cooler 69) is higher than the flow resistance of the first-coolant path via which the first coolant flows into the inverter cooler 61.

In the above-described embodiments, the inverter cooler 61 and the switching circuit cooler 62 (or the inverter cooler 69) are formed as two separate coolers. Alternatively, the inverter cooler 61 and the switching circuit cooler 62 (or the inverter cooler 69) may be integrally formed into a single cooler.

Figure 11A:
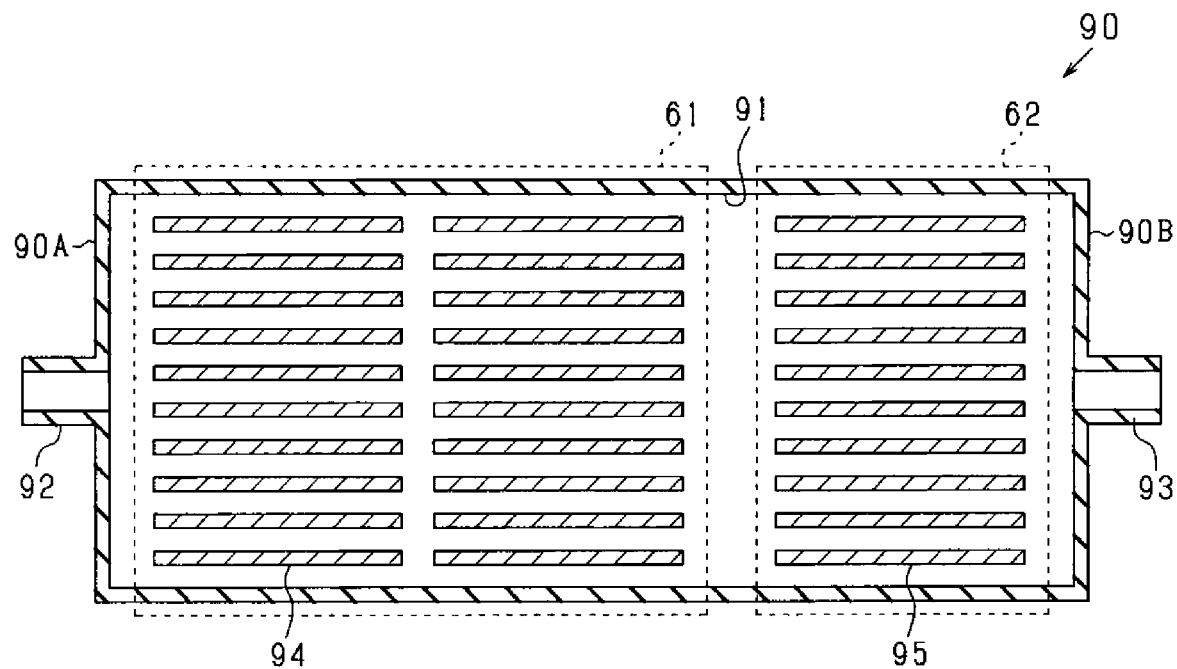
FIG. 11A is a cross-sectional view of an inverter cooler and a switching circuit cooler that are integrally formed into a single cooler according to one modification.
Figure 11B:
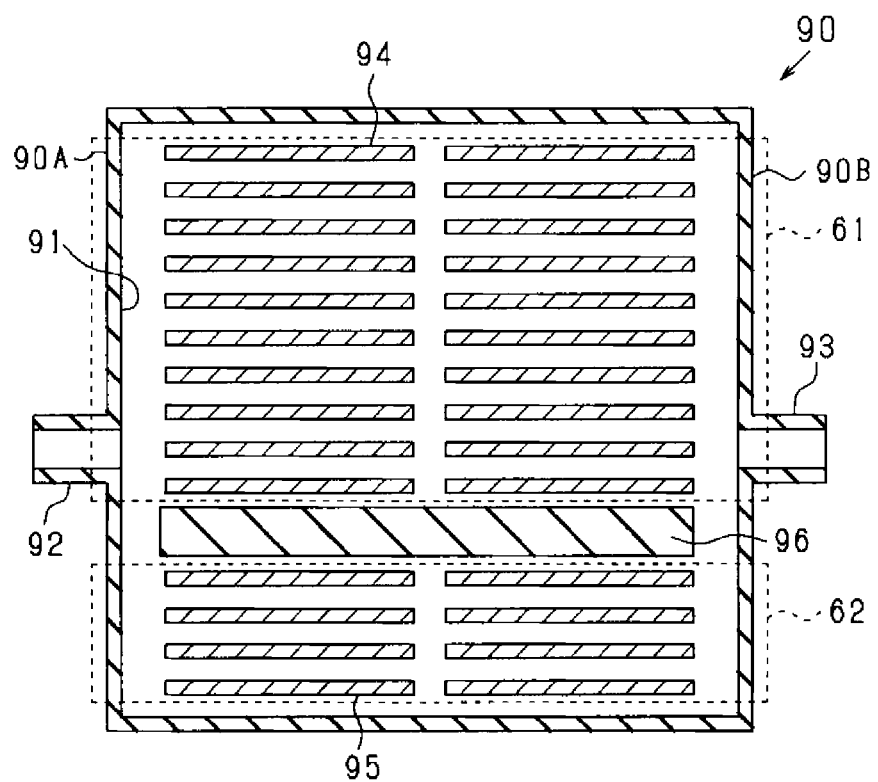
FIG. 11B is a cross-sectional view of an inverter cooler and a switching circuit cooler that are integrally formed into a single cooler according to another modification.

For example, as shown in FIGS. 11A and 11B, the inverter cooler 61 and the switching circuit cooler 62 may be integrally formed into a single cooler 90. The cooler 90 has the shape of a rectangular cuboid which has a smaller dimension in its thickness direction (i.e., the direction perpendicular to the paper surface of FIGS. 11A and 11B) than both in its longitudinal direction (i.e., the horizontal direction in FIGS. 11A and 11B) and in its width direction thereof (i.e., the vertical direction in FIGS. 11A and 11B). The cooler 90 has an internal space 91 formed therein. Moreover, the cooler 90 also has a pair of side walls 90A and 90B opposed to each other in the longitudinal direction thereof and a pair of openings 92 and 93 formed to respectively penetrate the pair of side walls 90A and 90B. In operation, the first coolant flows into and out of the internal space 91 of the cooler 90 via the openings 92 and 93.

Moreover, as shown in FIG. 11A, in the cooler 90, the inverter cooler 61 and the switching circuit cooler 62 may be fluidically connected in series with each other. In this case, fins 94 constituting the inverter cooler 61 are aligned with fins 95 constituting the switching circuit cooler 62 in the longitudinal direction of the cooler 90. Moreover, the number of the fins 94 and the number of the fins 95 are set, based on the difference between the amount Fe1 of heat generated by the inverter 20 and the amount Fe2 of heat generated by the winding switching circuit 50, so that the number of the fins 94 is greater than the number of the fins 95.

Alternatively, as shown in FIG. 11B, in the cooler 90, the inverter cooler 61 and the switching circuit cooler 62 may be fluidically connected in parallel with each other. In this case, fins 94 constituting the inverter cooler 61 are aligned with fins 95 constituting the switching circuit cooler 62 in the width direction of the cooler 90. Moreover, the number of the fins 94 and the number of the fins 95 are set, based on the difference between the amount Fe1 of heat generated by the inverter 20 and the amount Fe2 of heat generated by the winding switching circuit 50, so that the number of the fins 94 is greater than the number of the fins 95. Furthermore, between the fins 94 and the fins 95, there is provided a partition wall 96 via which the first coolant flowing into the inverter cooler 61 and the first coolant flowing into the switching circuit cooler 62 are separated from each other.

In the above-described embodiments, the second-coolant pump 84 of the second-coolant supplier 80 is formed integrally with the switching circuit cooler 62 and also functions as a heat exchanger to transfer heat between the first and second coolants. Alternatively, part of a second-coolant flow path of the second-coolant supplier 80 may be formed integrally with the switching circuit cooler 62 to function, instead of the second-coolant pump 84, as the heat exchanger to transfer heat between the first and second coolants.

In the above-described embodiments, the second-coolant pump 84 is implemented by a trochoid pump. Alternatively, the second-coolant pump 84 may be implemented by other types of pumps.

In the above-described embodiments, the through-holes 72 corresponding to the openings 73 and 74 are formed in the rotor 11 to axially penetrate the rotor 11. Alternatively, the rotor 11 may have a plurality of radial connection holes 75 and a plurality of pairs of first and second axial connection holes 75. Each of the radial connection holes 75 radially extends from the axial hole 71. Each of the first axial connection holes 75 is formed in the axial end face 11A of the rotor 11 to extend axially inward from the axial end face 11A and fluidically connected with the axial hole 71 via one of the radial connection holes 75. On the other hand, each of the second axial connection holes 75 is formed in the axial end face 11B of the rotor 11 to extend axially inward from the axial end face 11B and fluidically connected with the axial hole 71 via one of the radial connection holes 75.

In the first to the third embodiments, the inverter unit 28 and the switching circuit unit 58 are fixed respectively to the side wall 26A and the axial end wall 26B of the housing 26. Alternatively, both the inverter unit 28 and the switching circuit unit 58 may be fixed, for example, to the side wall 26A of the housing 26 in alignment with each other.

In the fourth embodiment, the stack of the inverter unit 28 and the switching circuit unit 58 is fixed to the axial end wall 26B of the housing 26. Alternatively, the stack of the inverter unit 28 and the switching circuit unit 58 may be fixed to the side wall 26A of the housing 26, with the switching circuit unit 58 located on the side wall 26A side.

What is claimed is:

1. A rotating electric machine unit comprising:
    a rotating electric machine;
    a plurality of electric circuits electrically connected with the rotating electric machine, the plurality of electric circuits including a high heat generation circuit and a low heat generation circuit that generates less heat than the high heat generation circuit during operation of the rotating electric machine;
    a first cooler configured to cool both the high heat generation circuit and the low heat generation circuit with a first coolant;
    a first-coolant supplier configured to supply the first coolant to the first cooler;
    a second cooler configured to cool the rotating electric machine with a second coolant; and
    a second-coolant supplier configured to supply the second coolant to the second cooler, wherein:
        the second-coolant supplier is formed integrally with a low heat generation circuit-cooling part of the first cooler, the low heat generation circuit-cooling part being configured to cool the low heat generation circuit, and
        the second-coolant supplier includes a heat exchanger through which heat is exchanged between the first coolant and the second coolant.

2. The rotating electric machine unit as set forth in claim 1, wherein
    the second-coolant supplier includes a second-coolant pump configured to force the second coolant to flow, and
    the heat exchanger is constituted of the second-coolant pump.

3. The rotating electric machine unit as set forth in claim 2, wherein
    the second-coolant pump is a trochoid pump which includes an inner rotor and an outer rotor, and
    an axial end face of the inner rotor is located adjacent to the low heat generation circuit-cooling part of the first cooler.

4. The rotating electric machine unit as set forth in claim 1, wherein
    the rotating electric machine includes a rotating shaft, a rotor fixed on the rotating shaft to rotate together with the rotating shaft, and a stator located radially outside the rotor, and
    the second-coolant supplier includes an in-shaft flow path which is formed in the rotating shaft along an axial direction thereof and through which the second coolant flows.

5. The rotating electric machine unit as set forth in claim 4, wherein:
    the stator includes a stator core and a stator coil wound on the stator core,
    the stator coil has a pair of coil end parts protruding axially outward respectively from opposite axial end faces of the stator core,
    the second-coolant supplier further includes an in-rotor flow path that is formed in the rotor,
    in axial end faces of the rotor, openings of the in-rotor path are formed, and
    the second-coolant supplier is configured so that the second coolant flows from the in-shaft flow path into the in-rotor flow path and flows out of the in-rotor flow path through the openings.

6. The rotating electric machine unit as set forth in claim 1, wherein:
    the rotating electric machine includes a multi-phase coil that is comprised of a plurality of phase windings,
    the phase windings are electrically connected with each other at a selected one of a plurality of neutral points, each of the phase windings includes a plurality of winding sections that are connected in series, the high heat generation circuit is an electric power converter that is configured to energize each of the phase windings of the multi-phase coil, and the low heat generation circuit is a winding switching circuit that is configured to switch, for each of the phase windings of the multi-phase coil, at least one of the winding sections of the respective phase winding between an energized state and a de-energized state.

7. The rotating electric machine unit as set forth in claim 1, wherein the rotating electric machine includes a rotating shaft, a rotor fixed on the rotating shaft to rotate together with the rotating shaft, and a stator located radially outside the rotor, the second-coolant supplier includes an in-shaft flow path which is formed in the rotating shaft along an axial direction of the rotating shaft and through which the second coolant flows, the second-coolant supplier also includes an in-rotor flow path that is formed in the rotor, in axial end faces of the rotor, openings of the in-rotor flow path are formed, the second-coolant supplier is configured so that the second coolant flows from the in-shaft flow path into the in-rotor flow path and flows out of the in-rotor flow path through the openings, the stator includes a stator core having a plurality of slots formed therein and a stator coil wound on the stator core to be received in a plurality of radially-aligned layers in each of the slots of the stator core, the stator coil is a multi-phase coil that is comprised of a plurality of phase windings, the phase windings are electrically connected with each other at a selected one of a plurality of neutral points, each of the phase windings includes a first winding section and a second winding section that are connected in series, the first winding sections of the phase windings are always kept in an energized state during operation of the rotating electric machine, the second winding sections of the phase windings are kept in an energized state only when the rotating electric machine is in a specific operating state, the stator coil has a pair of coil end parts protruding axially outward respectively from opposite axial end faces of the stator core, and the first and second winding sections of the phase windings of the stator coil are received in the slots of the stator core so that at least part of the first winding sections are located radially inside the second winding sections.

* * * * *